US012619887B2

(12) United States Patent
Zhang et al.

(10) Patent No.: US 12,619,887 B2
(45) Date of Patent: May 5, 2026

(54) SYSTEMS AND METHODS FOR AN AUTOMATED DATA SCIENCE PROCESS

(71) Applicant: HITACHI VANTARA LLC, Santa Clara, CA (US)

(72) Inventors: Yongqiang Zhang, Lexington, MA (US); Wei Lin, Plainsboro, NJ (US); William Schmarzo, Palo Alto, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 604 days.

(21) Appl. No.: 18/021,487

(22) PCT Filed: Aug. 20, 2020

(86) PCT No.: PCT/US2020/047221
    § 371 (c)(1),
    (2) Date: Feb. 15, 2023

(87) PCT Pub. No.: WO2022/039748
    PCT Pub. Date: Feb. 24, 2022

(65) Prior Publication Data
    US 2023/0289623 A1    Sep. 14, 2023

(51) Int. Cl.
    *G06N 5/022*    (2023.01)
(52) U.S. Cl.
    CPC .................................... *G06N 5/022* (2013.01)

(58) Field of Classification Search
    None
    See application file for complete search history.

(56) References Cited

U.S. PATENT DOCUMENTS

| | | | |
|---|---|---|---|
| 8,818,932 B2 | 8/2014 | Nolan et al. | |
| 10,983,507 B2 * | 4/2021 | Cella .................. | G05B 23/0264 |
| 11,176,507 B2 * | 11/2021 | Alifantis ................ | G05B 17/02 |
| 2017/0102693 A1 | 4/2017 | Kidd et al. | |
| 2017/0243135 A1 | 8/2017 | Ooba et al. | |
| 2017/0285584 A1 | 10/2017 | Nakagawa et al. | |
| 2018/0086344 A1 | 3/2018 | Zhu et al. | |

* cited by examiner

*Primary Examiner* — Richard L Bowen
(74) *Attorney, Agent, or Firm* — PROCOPIO, CORY, HARGREAVES & SAVITCH LLP

(57) ABSTRACT

Example implementations described herein are directed to systems and methods for generation and deployment of automated and autonomous self-learning machine learning models, which can include generating a predictive model and a prescriptive model through an offline learning process at a first system; controlling operations of a second system through deploying the predictive model and the prescriptive model to the second system; and autonomously updating the predictive model and the prescriptive model from feedback from the second system through an online learning process while the prescriptive model and the predictive model are deployed on the second system.

13 Claims, 9 Drawing Sheets

SYSTEMS AND METHODS FOR AN AUTOMATED DATA SCIENCE PROCESS

CROSS-REFERENCE TO RELATED APPLICATIONS

This Application is a 371 National Phase Patent Application of International Application Number PCT/US2020/047221, filed on Aug. 20, 2020, the entire contents of which is incorporated herein by reference.

BACKGROUND

Field

The present disclosure is generally directed to data science techniques, and more specifically, to data science processes and automated machine learning (AutoML).

Related Art

In the related art, the data science process defines the methodology to deliver analytics solutions and intelligent applications efficiently and effectively. Automated Machine Learning (AutoML) is a system of framework that can automatically build model(s) for the given data, which automates the maximum number of steps in an ML pipeline, minimizes the human effort, and improves the model performance.

In related art implementations there are AutoML frameworks that involve predictive component. The AutoML frameworks of the related art involve static implementations that are specifically tailored to a particular ML implementation, and are not generally customizable. Moreover, such related art implementations do not utilize an automated data science process.

SUMMARY

Related art implementations do not have components to facilitate descriptive and exploratory analysis, prescriptive, automation or autonomous learning components. Example implementations described herein are directed to facilitating these components besides predictive component through a unified, highly customizable and extensible framework configured to provide an automated data science process.

The conventional data science process has several problems. Firstly, the conventional data science process is not comprehensive enough to support value-driven tasks. There is a need to have a comprehensive process that allows for data science practitioners to understand specifically how to drive value. Secondly, the conventional data science process only focuses on the offline process. No online data science process has been proposed, nor is there a data science process that combines both offline process and online process in the related art. There is a need to have a data science process that support both offline process and online process. The online process can be critical for the real world system since it facilitates the automation and autonomous learning to obtain the best-fit models based on the real time data in a dynamic system. Further, the conventional data science process requires human beings to perform a significant amount of manual work. There is a need for a system that automatically performs the tasks in the data science process.

Related art implementations of AutoML frameworks have several deficiencies. Firstly, the related art AutoML frameworks only handle the "predictive" aspect of the data science tasks, while the generic work in other components of the data science process is not automated. There is a need for a system that automates the generic work in the data science process.

In related art implementations, each AutoML library only supports one underlying machine learning library. There is a need to facilitate a unified and extensible system to support various machine learning libraries.

To address the above needs, the example implementations described herein involve a comprehensive data science system that is descriptive, exploratory, predictive, prescriptive, automation, and autonomous, as well as configured to support value driven tasks. This process involves an offline process and online process that are seamlessly integrated as one whole system.

In example implementations described herein, there is an offline process that defines the methodologies and workflows for all data science tasks against historical data. This process corresponds to the first four components to facilitate the Descriptive, Exploratory, Predictive, and Prescriptive aspects of the system.

In example implementations described herein, there is an online process that defines the methodologies and workflows for all data science tasks against real-time data. This process corresponds to the last four components to facilitate Predictive, Prescriptive, Automation, Autonomous.

In example implementations, described herein, there is an automated system for the data science process in which AutoML is applied to each step of the process to reduce the manual work and optimize outcomes. A unified, customizable and extensible framework is introduced and provided to support the system.

Aspects of the present disclosure can include a method for generation and deployment of automated and autonomous self-leaning machine learning models, the method involving generating a predictive model and a prescriptive model through an offline learning process at a first system; controlling operations of a second system through deploying the predictive model and the prescriptive model to the second system; and autonomously updating the prescriptive model and the predictive model from feedback from the second system through an online learning process while die prescriptive model and the predictive model are deployed on the second system.

Aspects of the present disclosure can include a system for generation and deployment of automated and autonomous self-learning machine learning models, the system involving means for generating a predictive model and a prescriptive model through an offline learning process at a first system; means for controlling operations of a second system through deploying the predictive model and the prescriptive model to the second system; and means for autonomously updating the prescriptive model and the predictive model from feedback from the second system through an online learning process while the prescriptive model and the predictive model are deployed on the second system.

Aspects of the present disclosure can include a non-transitory computer readable medium, storing instructions for generation and deployment of automated and autonomous self-learning machine learning models, the instructions involving generating a predictive model and a prescriptive model through an offline learning process at a first system; controlling operations of a second system through deploying the predictive model and the prescriptive model to the second system; and autonomously updating the prescriptive model and the predictive model from feedback from the second system through an online learning process while the prescriptive model and the predictive model are deployed on the second system.

Aspects of the present disclosure can involve a system for generation and deployment of automated and autonomous self-learning machine learning models, the system involving a first system with a processor configured to generate a predictive model and a prescriptive model through an offline learning process; control operations of a second system through deploying the predictive model and the prescriptive model to the second system; and autonomously update the prescriptive model and the predictive model from feedback from the second system through an online learning process while the prescriptive model and the predictive model are deployed on the second system.

BRIEF DESCRIPTION OF DRAWINGS

FIG. 1(*b*) illustrates an example flow for the offline process, in accordance with an example implementation.

DETAILED DESCRIPTION

Figure 1A:
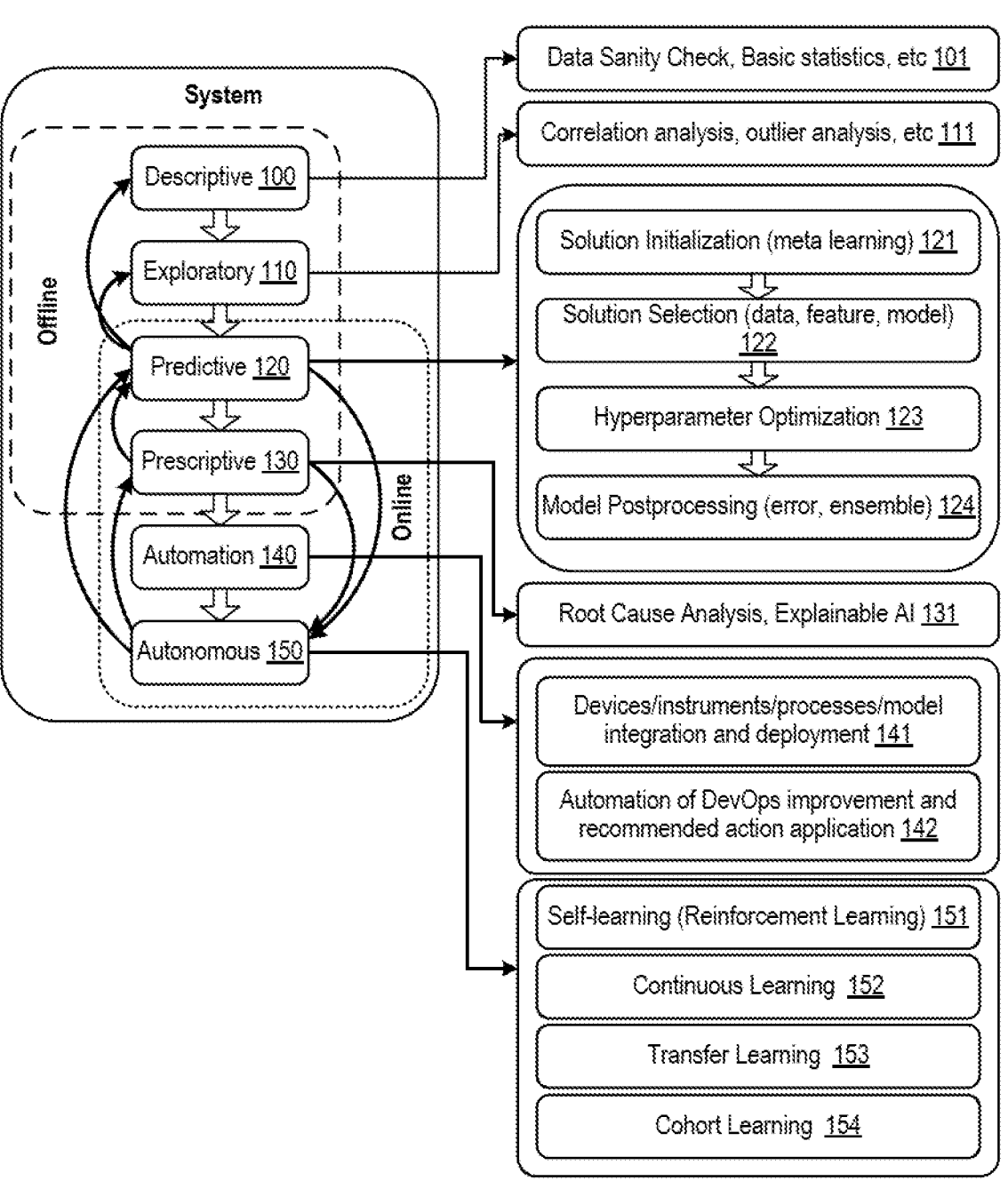
FIG. 1(*a*) illustrates an example of an automated system for both the offline and the online processes, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein are directed to a system that facilitates a comprehensive data science process to help drive business value, including descriptive, exploratory, predictive, prescriptive, automation, and autonomous components.

The descriptive component is directed to the understanding and evaluation of the business problem, data, and technology. The descriptive step provides the prioritization, feasibility, return on investment, and actionable business use case through the use of data statistics, dictionaries, dashboards, and reports. The descriptive step utilizes the case value determination to identify the key performance indicators/metrics to measure success of the system. The descriptive step further assesses the technology, data and analytics feasibilities, and risks, and further involves data understanding and sanity checks while using value chains to avoid orphan analytics.

The exploratory component involves exploratory data analysis and data engineering through hypothesis building and developments, data exploration (e.g., correlation analysis, outlier analysis, trending, centricity, and seasonality analysis, etc.), building data visualizations, illustrative analytics, data engineering (e.g., integration, normalization) and identifying variables that could be used as better predictors.

The predictive component is directed to building a predictive model based on the knowledge learned from the descriptive and exploratory components. The predictive component can involve statistical and machine learning driven analysis (codify cause-and-effect), "Goodness of Fit" measures, codifying patterns/relationships buried in the data, data enrichment, feature engineering, creation of asset & physics behavioral models, and supervised/unsupervised/reinforcement machine learning.

The prescriptive component is directed to generating prescriptive actionable recommendations in response to the predictions from the predictive component, and can involve root cause analysis, explainable artificial intelligence (AI), generation of actionable recommendations, mining and incorporation of asset & physics behavioral models, measuring decision effectiveness, and conducting constraint-based optimization.

The automation component focuses on integrating with the operating environment or system and automating the application of prescriptive actions to the operating environment or control systems. The automation component can involve model deployment and execution, model lifecycle management, automating the application of prescriptive actions to the operating environment or control systems, smart products or devices, intelligent applications, and decision effectiveness. The automation hardware components, including Programmable Logic Controllers (PLCs), robots, variable frequency drives (VFD), smart products or devices, sensors, and so on, can be programmed to support automation tasks, such as automating the application of prescriptive actions. The automation components can facilitate several benefits, including but not limited to, an increase in productivity, throughput, and revenue, improvement in product quality, enhancement of health and safety, reduction of utility/energy cost, reduction of downtime in the industrial system, and reduction of diagnosis time for system failures as well as cost of maintenance/repair.

The autonomous component focuses on continuous learning based on new data and feedback, and can include reinforcement learning, transfer learning, automatons learning (e.g., knowledge store, knowledge graph, user behavior, etc.), cohort learning through several sub-systems (or domains), and automating the continuous learning based on the new data/evidence and/or error/feedback. The automation and autonomous components are integrated together to support automating the application of prescriptive actions, retrieve new data, error and feedback, re-train the predictive and prescriptive models, and make intelligent decisions on the prescriptive actions on controlling the systems to work more efficiently and effectively, by leveraging the autonomous learning capabilities. This is in contrast to related art automation systems in which rule-based models or algorithms are designed and maintained by human beings to support the system automation.

As many tasks in the system are generic across different data science tasks, example implementations described herein automate the generic components in each component with the AutoML techniques to save the development time and improve the performance of the solutions.

FIG. 1(a) illustrates an example of an automated system for both the offline and the online processes, in accordance with an example implementation. In the example implementation of FIG. 1(a), example subsets of the generic content that can be automated are illustrated.

In the example of FIG. 1(a), the offline system involves the descriptive component 100, exploratory component 110, predictive component 120, and prescriptive component 130. The offline system runs against offline or historical data. The output from the offline system includes data analysis results from the descriptive component 100 and exploratory component 110, predictive model(s) from the predictive component 120, and prescriptive model(s) from the prescriptive component 130.

The descriptive component 100 is configured to provide descriptive analysis 101 (e.g., data sanity checks, statistics, etc.) as output when provided with a problem and dataset as input. The exploratory component 110 is configured to provide exploratory analysis 111 (e.g., correlation, outlier, etc.) for a given dataset if the dataset is of sufficient quality for conducting the analysis. The predictive component 120 is configured to construct predictive models based on the exploratory analysis if the exploratory analysis is of sufficient quality to do so. If not, more descriptive analysis or exploratory analysis can be conducted until sufficient quality is achieved. The predictive component 120 can conduct many activities for predictive modeling, include solution initialization 121, solution selection 122, hyperparameter optimization 123, and postprocessing 124. The prescriptive component 130 is configured to construct prescriptive models 131 (e.g., root cause analysis, recommendation, explainable AI, etc.) based on the predictive models. If the predictive models are not of sufficient quality to construct the prescriptive models, then the predictive models can be reconstructed by the predictive component 120.

In an example of the online system, the online system is configured to take in online or real-time data as input. The output from the online system includes predictions, actionable recommendations, control signals to the control system or machine system, and continuously learned models. In example implementations of the online system, the predictive component 120 is configured to deploy the models from the offline system into the online system to conduct predictions based on the real-time data input. The prescriptive component 130 is configured to generate prescriptive actions from the prescriptive model based on the predictions provided by the predictive component 120.

The automation component 140 is configured to automatically apply the prescriptive actions to the control system and change the operation of the underlying machine/asset. The automation component 140 can involve devices/instruments/processes/model integration and deployment 141 as well as automation of DevOps improvement and recommended action application 142.

The autonomous component 150 is configured to determine errors and/or feedback based on the comparison of predictions along with associated prescriptive actions to the observed incidents and the action items. With the real-time data and current version of the model, the information is utilized to re-train and improve the predictive and prescriptive models. The re-trained models are evaluated against reserved test data. If the re-trained models have better performance, they will be deployed to the online system, otherwise, the current versions of the models will remain. The autonomous component 150 can involve self-learning (e.g., reinforcement learning) 151, continuous learning 152, transfer learning 153 and cohort learning 154.

Figure 1B:
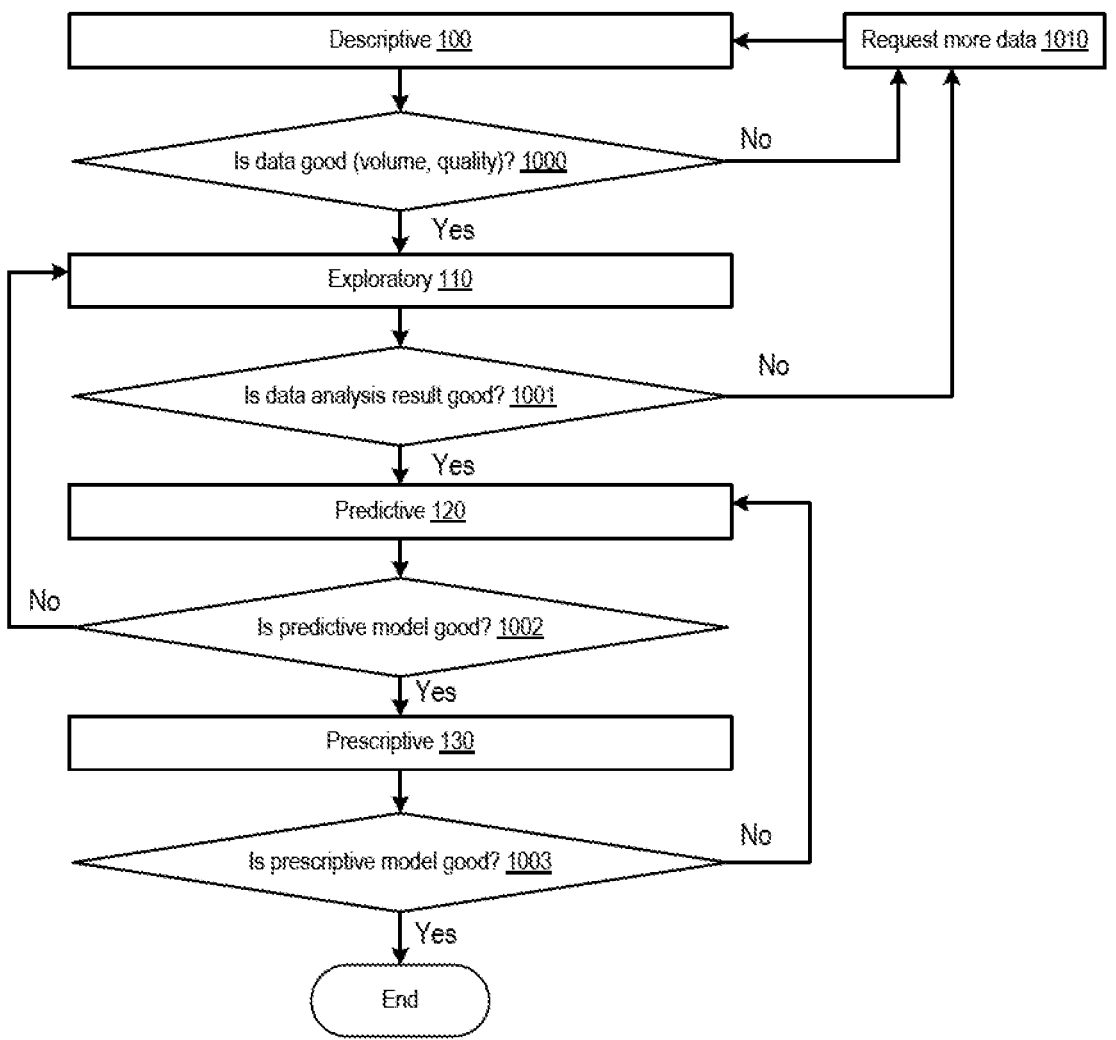

FIG. 1(b) illustrates an example flow of the offline process, in accordance with an example implementation. At first, the descriptive component 100 is invoked as illustrated in FIG. 1(a). At 1000, a determination is made as to whether the data is sufficient to facilitate descriptive analysis. If so (Yes), then the flow proceeds to the exploratory component 110 to determine explanatory analysis as illustrated in FIG. 1(a), otherwise (No), the flow proceeds to 1010 to request more data from the systems.

At 1001, a determination is made as to whether the descriptive analysis and the exploratory analysis is of sufficient quality to construct models. If so (Yes), then the flow proceeds to the predictive component 120 to generate predictive models from the exploratory and predictive analysis. Otherwise (No), the flow proceeds back to 1010 to obtain more data to conduct the analysis.

At 1002, a determination is made as to whether the predictive models generated by the predictive component 120 have sufficient accuracy against the historical data. If so (Yes), the flow proceeds to the prescriptive component 130 to generate prescriptive models. Otherwise (No), the flow proceeds back to the exploratory component 110 to generate further exploratory analysis.

At 1003, a determination is made as to whether the prescriptive models generated by the prescriptive component 130 have sufficient accuracy. If so (Yes), then the flow ends and the online system is invoked as the predictive and prescriptive models are deployed online to the underlying systems. Otherwise (No), the flow proceeds back to the predictive component 120 to regenerate predictive models.

Figure 2:
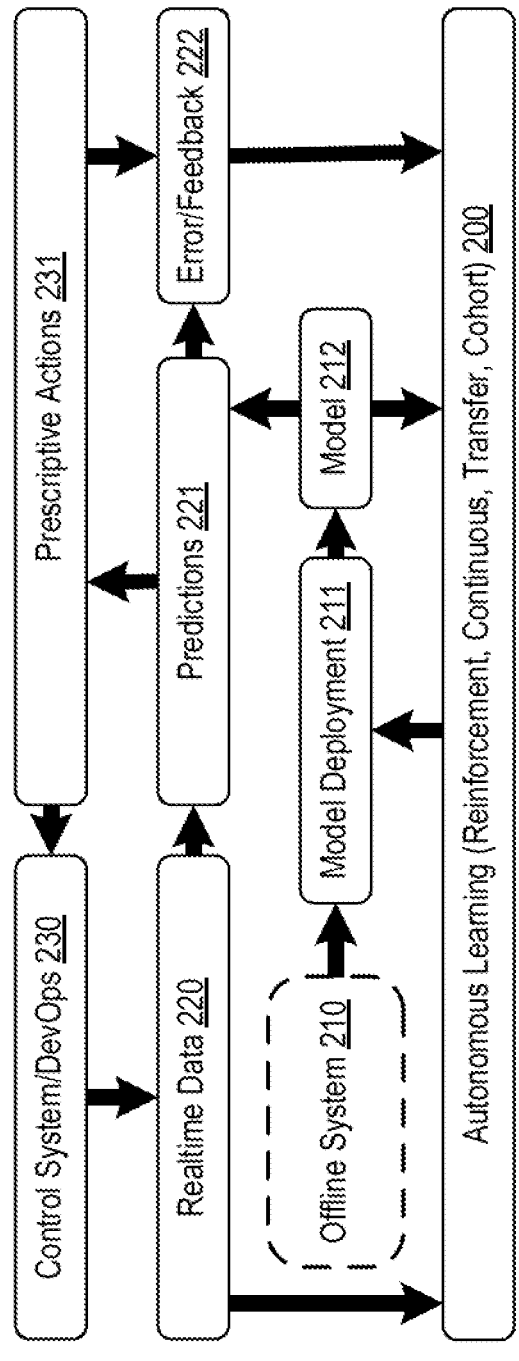
FIG. 2 illustrates an example workflow of the online system as integrated with the offline system, in accordance with an example implementation.

FIG. 2 illustrates an example workflow of the online system as integrated with the offline system, in accordance with an example implementation. As shown in FIG. 2, the online system runs against online data (or real-time data) to apply the predictive models and prescriptive models to generate predictions and actionable recommendations, automatically apply the recommendations to the control system, and continuously self-learn based on new data, errors, and feedback. An example of the workflow is as follows.

At first, the offline system 210 is configured to generate and provide a predictive model and prescriptive model for the online system, which are then deployed to the online system at 211. At 212, the models are executed in the online system to conduct predictions 221 against real-time data 220. Prescriptive actions 231 are also generated from the prescriptive model based on the predictions 221 and are automatically applied to the control systems 230. The control systems/DevOps 230 then responds to the prescriptive actions by altering the configuration of how the assets and machines work, and thereby impact the real-time data collected from the sensors.

In real time, errors are automatically generated by comparing the predictions 221 and observed values at 220. Feedback about the prediction and prescriptive actions can also be generated automatically by parsing operator logs.

The errors, feedback and new data are combined to re-train both the predictive and prescriptive models through autonomous learning 200.

Several techniques for autonomous learning 200 can be used, including continuous learning, transfer learning, reinforcement learning, fine-tuning techniques, boosting, and so on, in accordance with the desired implementation. Depending on the desired implementation, continuous learning could be done in real-time or based on a predefined schedule. The re-trained models are evaluated against reserved test data; if the models have better performance, they are deployed to the online system at 211, otherwise, the current versions of the models remain on the online system.

In another example implementation, re-trained models can be deployed into the online system alongside the existing models. Both existing models and re-trained models will run against the real time data to generate predictions and prescriptive actions, for a predefined time period. However, during the predefined time period, only predictions and prescriptive actions generated from the existing models take effect. When the predefined time period comes to the end, the existing models and re-trained models are evaluated and compared based on the predictions and prescriptive actions during the predefined time period, and the models with the better performance will be retained in the online system and take effect.

Through the example implementations, the online system attempts to solve for the "best-fit" solution in real-time based on the real-time situation in the underlying industrial system. The metrics and objectives to be analyzed by the models themselves can be configured in accordance with the desired implementation based on the underlying industrial system.

As illustrated in FIG. 2, once the model is built, it is deployed into the physical runtime environment. Access to the physical runtime environment (e.g., the customer environment) can be difficult and costly. To address such issues, the example implementations involve a package that contains the model which can be easily deployed into the physical runtime environment.

To achieve such example implementations, the model file is rendered in a standard format, and the package of the model file is made to be portable to any physical runtime environment so that the model can be deployed and executed. To solve the first issue, example implementations use the standard pickle file format for the model file and use MLFlow to manage the model lifecycle. To solve the second issue, example implementations package the MLFlow package (that contains the model file) into a Docker image, which is a virtual runtime environment including the MLFlow package and can run on top of the physical runtime environment facility.

Machine learning lifecycle management is an efficient way to manage the lifecycle of models, including model building, model deployment, model versioning, and so on. In example implementations described herein, more focus is put onto standardizing the format of the delivered model and make it usable in different running environment. In the example implementations herein, one implementation is to use the pickle file format for the model file and package it into an MLFlow package, where MLFlow is an existing model lifecycle management tool. Model versioning is based on the model performance: when a new model is built, it is evaluated against reserved test data based on the metrics. If the evaluation result is good (and better than existing model), it is retained; otherwise, it is discarded.

Autonomous learning is an Artificial Intelligence (AI) approach which promotes the machine (or other learner) to learn and analyze on its own without human assistance or supervision in a changing and uncertain world. With autonomous learning, learners are in charge of their own learning processes with autonomy. Autonomous learning is also called self-directed learning.

In example implementations, after the model is deployed in the physical runtime environment which is dynamic and changing over time, without human assistance or supervision, the model will automatically be tuned and improved based on the new real-time data, errors and feedbacks that are collected in the physical runtime environment, as shown in FIG. 2. Some techniques could be used for this purpose, including reinforcement learning, continuous learning, transfer learning, cohort learning, and so on.

Reinforcement learning is an area of machine learning concerned with how software agents ought to take actions in an uncertain, potentially complex environment in order to maximize the notion of cumulative reward, through a trial and error way. It starts with random trials and finishing with sophisticated tactics to achieve the goal.

In example implementations described herein, reinforcement learning starts with the deployed offline model (which is better than random trials), make predictions and generate prescriptive actions. The application of the prescriptive action changes the behavior of the physical runtime environment, including the collected data. The new data, model errors and feedbacks, and the target of the problem are collected and are used to compute the next prescriptive actions. Several state-of-the-art techniques can be used, including Deep Q Network (DQN), Deep Deterministic Policy Gradient (DDPG). Proximal Policy Optimization (PPO), Twin Delayed Deep Deterministic Policy Gradient (TD3), and so on in accordance with the desired implementation.

One example is provided to explain different elements in the reinforcement learning modeling. In one example, a model is built to optimize the yields from a plant. To build the offline model, key factors to the plant yield are determined and used as features, and the yields are used as the target, to build a supervised regression model. Once the offline model is built, it can be deployed into the online system. Now the reinforcement learning is used to optimize the yields on top of the offline model as follows:

"State": a state defines the observations that the learning agent receives from the environment. For this example, it is the state of the current plant which includes the sensor readings, operational parameters, and current yield.

"Policy": a policy defines how the learning agent behaves at a given time in the current state of the environment. For this example, it defines a mapping from perceived current states of the plant to actions to be taken to optimize the yields.

"Reward": A reward defines the goal of a reinforcement learning problem. For this example, the reward is the "plant yield". The reward indicates outcomes of actions in an immediate sense: each action results immediately on a reward.

"Value Function": The value of a state is the total aggregated amount of rewards that the learning agent can expect to obtain since that state. For this example, it is the aggregated plant yields over a time period, say one month, from a state. A value function defines the rewards in the long run.

Note that the machine learning techniques that are used in the offline model and online model can be different. In this example, the offline model is based on supervised learning techniques, while online model is based on reinforcement learning techniques.

Continuous learning is a machine learning technique that promotes improving the existing model for the same problem gradually and continuously with newly collected data in the system. In example implementations, after the model from the offline system is built, it gets deployed into the online system. The new real-time data that are collected in the online system are used to re-train the model and improve the model to achieve better performance. The new model adapts to the new data to make itself a best-fit model. Re-training model can happen with a predefined schedule, which could be real-time, daily, weekly, etc. depending the need and the cost of training. For continuous learning, the machine learning techniques used in offline model and online model are the same.

Transfer learning is a machine learning technique that promotes building a model for one problem by leveraging the knowledge learned from related problems. The reasons to use transfer learning include: not enough historical data for the new problem; training cost is very high for the data from the new problem; the new problem and existing problem are very similar and the new problem can benefit from the model built for the existing problem. In example implementations described herein, after the offline model is built for one problem, it gets deployed into the online system for another problem. The model gets re-trained and improved with the real time data from the online system for the new problem. This can thereby be an efficient and effective way to build a model for a new problem. For transfer learning, the machine learning techniques used in offline model and online model are the same.

Figure 3:
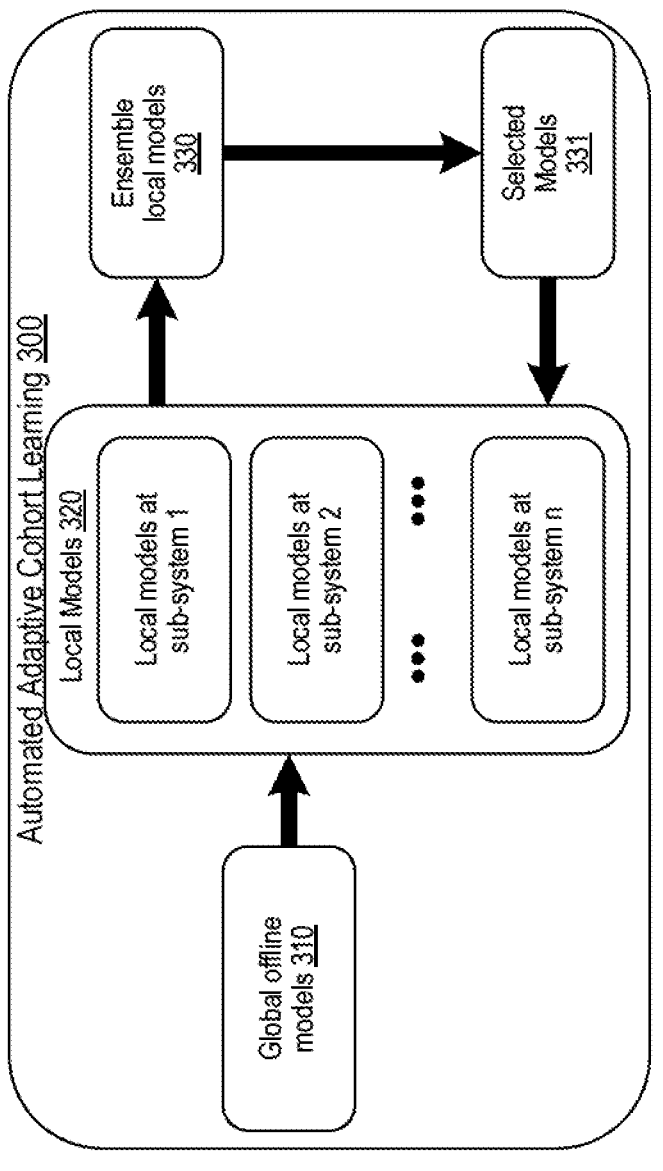
FIG. 3 illustrates an example of an automated adaptive cohort learning, in accordance with an example implementation.

FIG. 3 illustrates an example of an automated adaptive cohort learning, in accordance with an example implementation. The industrial system may involve several similar components that work concurrently. If the whole system is too big and/or the computing power to build models is not enough in the online system, one design is to use automated adaptive cohort learning 300 to distribute the online model building work into each sub-system at 320, combine the models from sub-systems at 330, and distribute the combined models back to each sub-system at 331, as illustrated in FIG. 3. The subsystems can be identified based on the hierarchical design of the whole system, i.e. asset model. The workflow of the automated adaptive cohort learning 300 can involve the following.

At 310, a global offline predictive model and a global offline prescriptive model are trained based on all the historical data in the system. Building offline model is a one-time work and assume the requirements for the computing hardware resources to build offline model can be met. The global predictive model and global prescriptive model are deployed into each sub-system at 320. Each sub-system is installed with an online system as shown in FIG. 2, and it follows the workflow as illustrated in FIG. 2. At each sub-system of the local models 320, each pair of local models (predictive and prescriptive) is updated with autonomous learning as shown in FIG. 2.

At some predefined schedule (e.g., every day), the local models at the sub-systems will be ensembled together to make global models at 330. Depending on how the models are evaluated, there are two design schemes that can be employed to ensemble the local models into global models. One example design scheme can involve a global evaluation. Let each pair of local models (predictive and prescriptive) run against new global data across the whole system for a predefined time period (e.g., 3 hours). Then, the global evaluation design scheme measures the performance score of each pair of local models based on predefined evaluation metrics, which can be business metrics or otherwise in accordance with the desired implementation. The output of the model evaluation is a vector, wherein each element is the performance score for a pair of local models (predictive and prescriptive). Finally, the global evaluation design scheme finds the highest performance score and selects the corresponding models.

Another design scheme can involve local evaluation. Let each pair of local models (predictive and prescriptive) run against new local data at each sub-system for a predefined time period (say 3 hours). Then, the local evaluation design scheme measures the performance score of each pair of local models based on predefined evaluation metrics, which can be business metrics or otherwise in accordance with the desired implementation. The output of the model evaluation is a matrix, where each element is the performance score for a pair of local models (predictive and prescriptive) against a local data at each sub-system. Finally, the local evaluation design scheme can check how many times each pair of local models ranks the highest based on performance scores across all the local data, and select the model that wins most of the time.

In an example of another design scheme for local evaluation, example implementations can calculate the average performance scores for each pair of local models (predictive and prescriptive) across the local datasets and select the model with the highest average performance score as the global models.

In an example of another design scheme for local evaluation, example implementations can convert the performance score matrix to ranking matrix, calculate the average ranking for each pair of local models (predictive and prescriptive) across the local datasets and select the model with the highest ranks as the global models.

In an example of another design scheme for local evaluation, instead of selecting one pair of global models (predictive and prescriptive), the example implementations can get a pair of local models with the best performance score for each local dataset, and select a set of pairs of models (predictive and prescriptive) for all the sub-systems.

Finally, the selected models 311 are deployed to each sub-system in the local models 320. Through such example implementations, the online system can be automated and adaptive to the real time data.

The example implementations described herein provide a comprehensive data science process involving an offline process and online process that work seamlessly together as one process. To support the development of the automated system for the data science process described herein, example implementations involve a unified, highly customizable, and highly extensible framework that provides a unified and easy-to-use interface to various underlying machine learning libraries and fits the needs of data science practitioners of various expertise levels. The framework formulates each solution into two components as described below.

Solution configuration file: The solution configuration file defines the actions or items in all the steps of the data science process. The solution configuration file has a section for each step illustrated in FIG. 1(*a*) to specify configurations and instructions on how to execute each step. Each section may also have sub-sections to define the details of the work that need to be done.

Main program: the main program is the entry point to each solution. It reads the solution configuration file, follows the definition of each component, and executes the component accordingly.

The solution configuration file features the following key attributes.

Unified: Machine learning methods from multiple machine learning libraries can be specified in a single solution configuration file.

Extensible: The solution is easily extended with state-of-the-art techniques by adding a section to the solution configuration file.

Customizable: An optimized and general-purpose solution template is provided for each solution type, such as classification, regression, recommendation engine, clustering, and anomaly detection. Additionally, users can easily customize the solution configuration file to meet their own needs.

Figure 4:
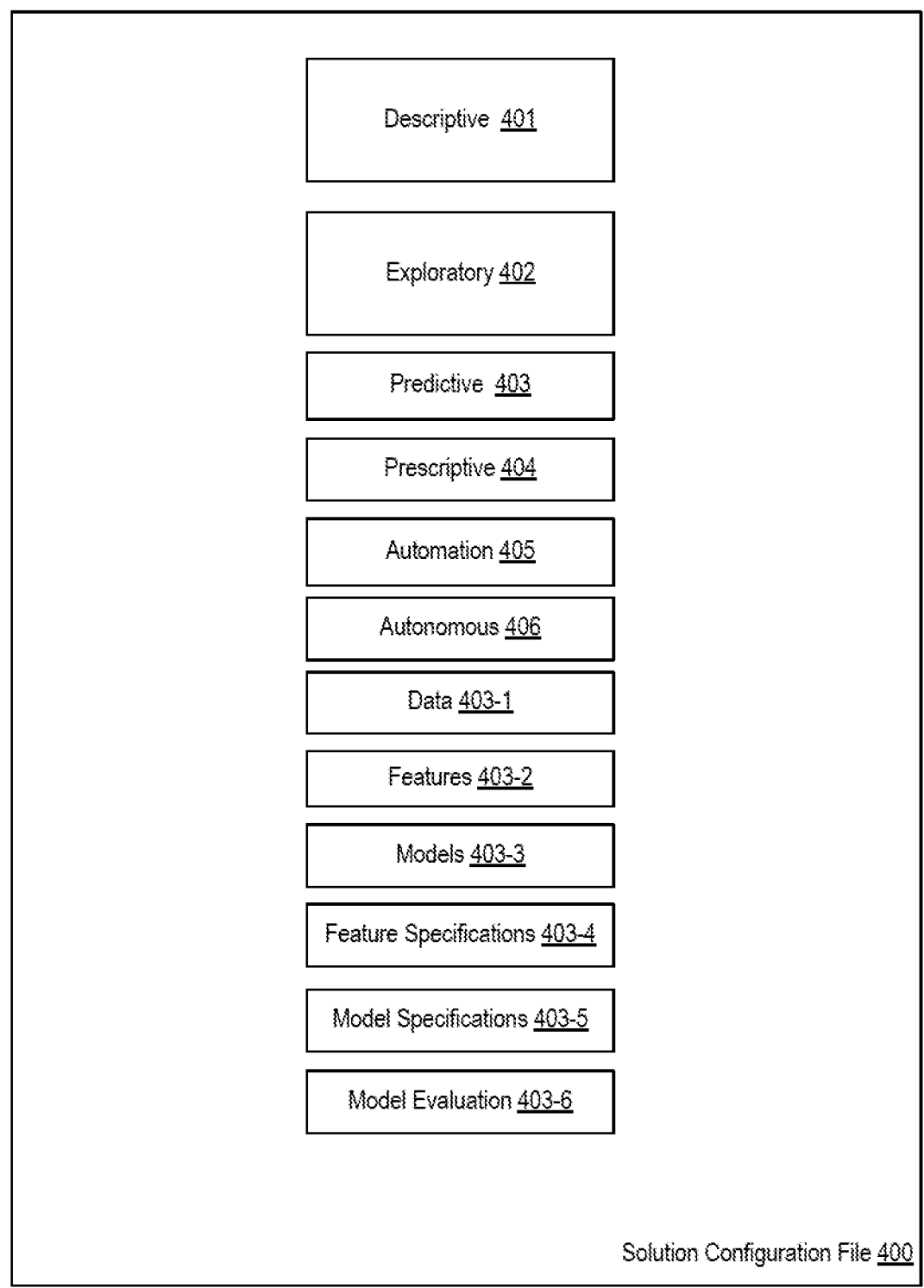
FIG. 4 illustrates an example of a solution configuration file in accordance with an example implementation.

FIG. 4 illustrates an example of a solution configuration file in accordance with an example implementation. The data science process involving the offline and online processes as described herein and as illustrated in FIG. 1(a) are executed in accordance with the solution configuration file 400 illustrated herein. Each solution has a solution configuration file, which is used to specify all the details of the solution. In example implementations described herein, the solution configuration file 400 has a section for each component illustrated in FIG. 1(a) to specify configurations and instructions on how to execute each component for the online and offline process. The configuration can include a section for each component; if more specifications are needed for each component, sub-sections are used to specify such details.

For the descriptive component 100, the descriptive section 401 can include a description of the data source and other metadata information relevant for the data source. Such metadata information can be utilized for descriptive component functions 101, such as a sanity check, identifying the amount of missing values, or information for basic statistics such as mean, median, standard deviation, and so on.

For the exploratory component 110, the exploratory section 402 can include data analysis 111 such as correlation analysis, outlier analysis, time series data analysis (trend, centricity, seasonality) and so on.

For the predictive component 120, the function of the predictive component 120 is directed to defining the type of problem to be solved (e.g., classification problem, etc.). The processes to be initialized can include solution initialization 121, solution selection 122, hyperparameter optimization 123, and model post-processing 124. The solution configuration file can include predictive 403 which can include solution initialization parameters indicative of the location of new data sets and solution initialization models, solution selection parameters indicative of the location of new dataset, and the location of solution selection models, hyperparameter optimization parameters indicative of the list of sub-sections for optimizing the solution candidates, and model postprocessing parameters. Examples of solution initialization, solution selection, hyperparameter optimization and model postprocessing that can utilize the parameters in the solution configuration file are described in PCT Application No. PCT/US2020/039647, titled "AUTOMATED MACHINE LEARNING: A UNIFIED, CUSTOMIZABLE, AND EXTENSIBLE SYSTEM", the contents of which are incorporated by reference in their entirety for all purposes.

In the example solution configuration file in FIG. 4, predictive section 404 mainly specifies configurations for the hyperparameter optimization. Hyperparameter optimization can include information regarding what data is used, how features will be processed, what models are to be used, the model algorithm for each of the models, how the models are to be evaluated, the parameters for the models, and other parameters in accordance with the desired implementation. The sub-sections for hyperparameter optimization can be: data 403-1, features 403-2, models 403-3, feature specifications 403-4, model specification 403-5, and model evaluation 403-6. Data 403-1 can indicate the data source or the data file from which data is to be extracted, and can include parameters such as labels, types of features involved, data splits, and so on in accordance with the desired implementation. Data 403-1 can also specify the input as well as the output. Features 403-2 indicate parameters for feature extraction, such as enabling/disabling extracting correlated features, variance thresholds based feature selection, and so on, in accordance with the desired implementation. Models 403-3 indicates the models to be applied to the data 403-1, such as, but not limited to, logistic regression, random forest classifier, gradient boosting classifier, support vector machine classifier, neural network classifier, and so on depending on the desired implementation. Feature specifications 403-4 can indicate the parameters for the features 403-2 that are incorporated. Model specifications 403-5 indicate the parameters for the models 403-3 that are incorporated. Evaluation 403-6 indicates the metrics used to evaluate the models 403-3.

For the prescriptive component 130 (and corresponding details 131), prescriptive section 404 can include the approach and associated parameters to compute the feature importance of the model; the approach and the associated parameters to conduct root cause analysis of the predictions: the approach and associated parameters to optimize the feature space to obtain the best target value; as shown at 131.

For the automation component 140, automation section 405 can include the approach and associated parameters to deploy the offline models into the online system as shown in 141; automating the application of prescriptive actions to the online system as shown in 142. Other automation tasks include integration with the online system (devices, machines, etc.) through API and/or data interface.

For the autonomous component 150, autonomous section 406 can include the approach and associated parameters to perform autonomous learning against the real time data. This would include one or more of the components: Reinforcement Learning 151, Continuous Learning 152, Transfer Learning 153 and Cohort Learning 154. The autonomous component runs within the online system and also needs to configure the model lifecycle management.

For some components (for instance, Models 403-3), the specifications in the solution configuration file may include what model algorithms in the underlying machine learning libraries need to be called, what parameters need to be passed to the model algorithms, and so on. A solution configuration file 400 is used to define each problem into consideration in each solution. For example, in a machinery situation, there may be a classification and regression problem, which is thereby specified with the whole solution, including how the data is to be preprocessed, how the feature engineering is conducted, what models are selected, parameter tuning, post processing, evaluation and so on.

The components illustrated in FIG. 1(a) parse through the solution configuration file and obtain the machine learning libraries to execute according to the file. Example implementations utilize the solution configuration file to define and specify the solution, and use a reflection technique as provided in most programming languages (such as Python, Java) to read and parse the solution configuration file. Through such example implementations, the outcome is that various analytics library and machine learning libraries can be used together in one solution.

In example implementations, the main program is the entry point to each solution and is configured to read the solution configuration file, follow the definition of each module and execute the module accordingly.

The solution configuration file features the following key attributes and here are more details after the content of the solution configuration file is discussed. The solution configuration file is unified such that machine learning methods, such as feature engineering and model algorithms from multiple machine learning libraries, can be specified in a single solution configuration file. The solution configuration file is extensible such that the solution is easily extended with state-of-the-art techniques by adding a section to the solution configuration file. The solution configuration file is customizable. An optimized and general-purpose solution template is provided for each solution type, including but not limited to: classification, regression, clustering, anomaly detection, recommendation engine, remaining useful life prediction. For hyperparameter optimization purposes, the template specifies all the possible feature engineering techniques and associated parameter grids, the model algorithms and associated parameter grids, and the evaluation techniques. Users can use the configurations specified in the solution template or they can modify the configurations and customize in a way that meets their needs.

Figure 5A:
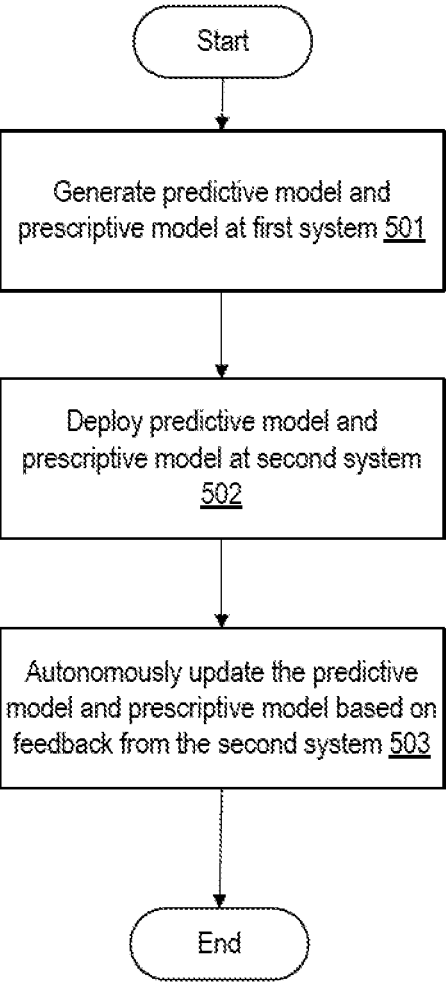
FIGS. 5(*a*) and 5(*b*) illustrate example flow diagrams for generation and deployment of automated and autonomous self-learning machine learning models, in accordance with an example implementation.

FIG. 5(a) illustrates an example flow for generation and deployment of automated and autonomous self-learning machine learning models, in accordance with an example implementation. In an example implementation, the flow generates and executes the descriptive component 100, exploratory component 110, predictive component 120, and prescriptive component 130 from the solution configuration file illustrated in FIG. 4 to generate a predictive model and a prescriptive model at a first offline system at 501. At 502, the flow then deploys the predictive model and the prescriptive model to the second online system to control the operations of the second system from the prescriptive actions generated by the prescriptive model in response to the real-time data provided from the second system. At 503, the flow autonomously updates the predictive model and prescriptive model based on real time data, errors and feedback from the second system as illustrated in FIG. 2 and FIG. 5(b).

Figure 5B:
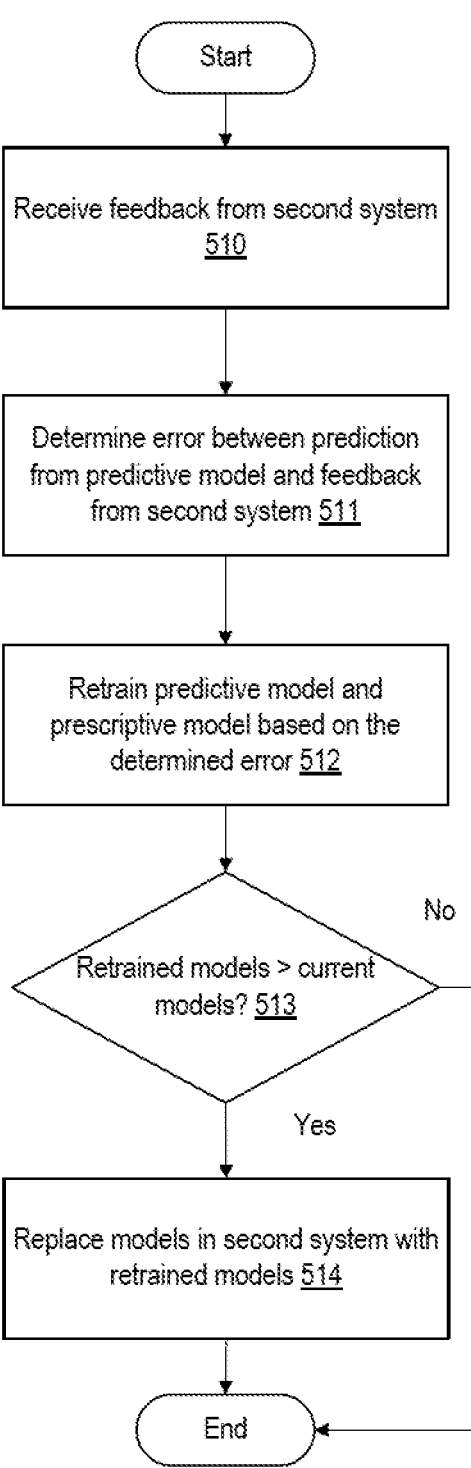

FIG. 5(b) illustrates an example flow for an online process configured to autonomously update the predictive model and the prescriptive model from the real time data, errors and feedback from the second system while the models are deployed, in accordance with an example implementation. At 510 the flow receives feedback from second system. At 511, the flow determines error between the prediction from the predictive model and the feedback from the second system. At 512, the flow retrains the predictive model and the prescriptive model based on the new data, the errors and feedback as illustrated in FIG. 3. At 513, a determination is made as to whether the retrained predictive model and retrained prescriptive model have better accuracy than the currently deployed predictive model and prescriptive model based on using reserved test data on the retrained models in comparison to the current models. If so (Yes), then the flow proceeds to 514 to replace the deployed models with the retrained models, otherwise (No), the flow ends. Refer to the example implementation involving how re-trained models can be deployed into the online system alongside the existing models for another example implementation to compare the existing models and re-trained models.

Through the flows as illustrated in FIGS. 5(a) and 5(b), the offline training system for generating models can be integrated with the online system deploying the models, thereby allowing for seamless updating of models for controlling the online systems without requiring the online systems to cease operations. After the offline models are deployed into the online system, the offline models can be improved based on historical data in parallel and then seamlessly replace the online models if performance improvement from offline model (compared to current version of online models) meets the predefined criteria, without interrupting the normal operation of the online systems.

Figure 6:
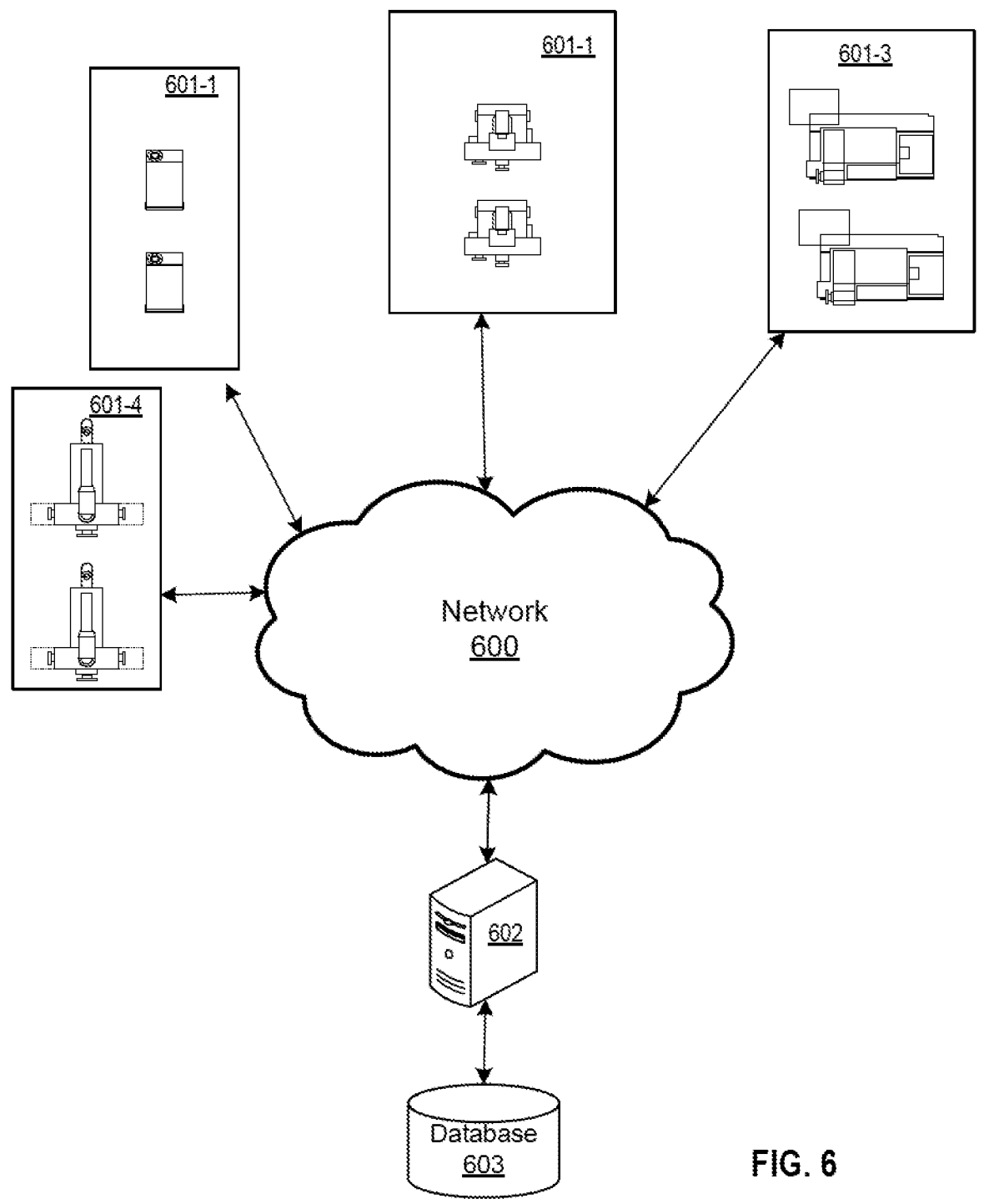
FIG. 6 illustrates a plurality of systems and a management apparatus, in accordance with an example implementation.

FIG. 6 illustrates a plurality of systems and a management apparatus, in accordance with an example implementation. One or more second systems 601-1, 601-2, 601-3, and 601-4 receive models to deploy online to their underlying apparatuses, and are communicatively coupled to a network 600 which is connected to a management apparatus 602 facilitating a first system that controls the offline models and processes and deploys the offline models to the one or more second systems 601-1, 601-2, 601-3, and 601-4. The management apparatus 602 manages a database 603, which contains data feedback aggregated from the systems in the network 600. In alternate example implementations, the data feedback from the second systems 601-1, 601-2, 601-3, and 601-4 can be aggregated to a central repository or central database such as proprietary databases that aggregate data from systems such as enterprise resource planning systems, and the management apparatus 602 can access or retrieve the data from the central repository or central database. Such systems can include apparatuses to be operated on by an operator for manufacturing or other processes, such as ladies, presses, mills, grinders, and so on, as well as mobile apparatuses such as forklifts, cranes, trucks as well as any other apparatuses that are to be operated on by an operator for the purposes of a manufacturing, factory, or other process. To deploy the predictive models and the prescriptive models online, each of the one or more second systems 601-1, 601-2, 601-3, and 601-4 can involve one or more programmable logic controllers (PLCs) to control operations of the underlying apparatuses directly, or Internet of Things (IoT) gateways configured to dispatch instructions to the underlying apparatuses to control the operations. The PLCs or IoT gateways can be configured to receive and execute the models from the management apparatus 602 to deploy the models to the underlying system, and provide feedback to the management apparatus 602. The management apparatus 602 can operate separately from the second systems 601-1, 601-2, 601-3, and 601-4 to operate offline and independently from the systems. The proposed automated system can be implemented as follows.

In an example use case of the example implementations, the system can be provided as a standalone system involving a machine learning library having software components for automatically performing various tasks in the data science process. In such an implementation, the user writes the code to call the functions in the library and manages the computation and data storage.

In an example use case of the example implementations, the system can be implemented as an on-premise software with graphical user interface (GUI) that exposes the functions provided in the machine learning library. The user executes the automatic data science process with the GUI and manages computation and data storage.

In an example use case of the example implementations, a software as a service (SaaS) based solution can be utilized through a web-based user interface to expose the machine learning library. The user subscribes to the service, uploads the data to the service provider, and uses the web-based user interface to perform the automatic data science process. The service provider manages computation and data storage.

In an example use case of the example implementations, the system can be incorporated as a micro-service or micro-application to expose the machine learning library.

Figure 7:
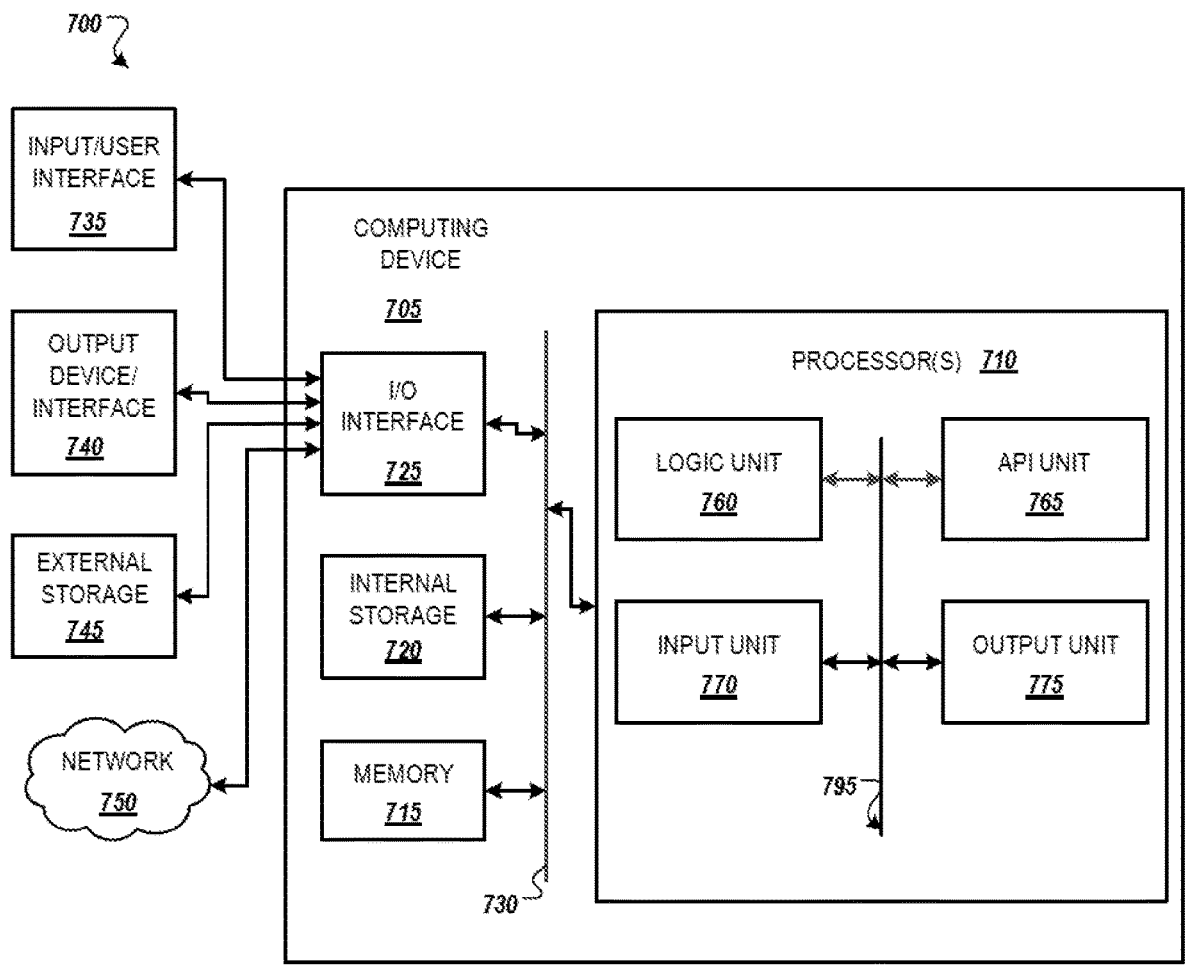
FIG. 7 illustrates an example computing environment with an example computer device suitable for use in some example implementations.

FIG. 7 illustrates an example computing environment with an example computer device suitable for use in some example implementations, such as a management apparatus 602 as illustrated in FIG. 6 or as a PLC/IoT Gateway of the second systems 601-1, 601-2, 601-3, 601-4 as illustrated in FIG. 6. Functionality described herein can be implemented at the management apparatus 602, or facilitated through a system based on some combination of elements, depending on the desired implementation.

Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705. I/O interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Processor(s) 710 can be configured to generate a predictive model and a prescriptive model through an offline learning process; control operations of a second system through deploying the predictive model and the prescriptive model to the second system; and autonomously update the prescriptive model and the predictive model from feedback from the second system through an online learning process while the prescriptive model and the predictive model are deployed on the second system as illustrated in FIG. 1(a), FIG. 5(a) and FIG. 5(b).

Processor(s) 710 is configured to control operations of the second system through deploying the predictive model and the prescriptive model to the second system by executing an automated application of prescriptive actions generated from the prescriptive model to change operations of the second system as illustrated in FIGS. 1(a) to 3.

Processor(s) 710 can be configured to generate the predictive model and the prescriptive model through the offline learning process at the first system by generating, from a solution configuration file, a descriptive component configured to conduct descriptive analysis; generating, from the solution configuration file and the descriptive analysis, an exploratory component configured to conduct exploratory analysis; generating, from the solution configuration file and the exploratory analysis, a predictive component configured to incorporate one or more machine learning libraries specified in the solution configuration file to generate the predictive model; and generating, from the solution configuration file and the predictive model, a prescriptive component configured to map prescriptive actions to results from the predictive model to generate a prescriptive model as illustrated in FIGS. 1(a) and 4.

Processor(s) 710 can be configured to control operations of the second system through deploying the predictive model and the prescriptive model to the second system by deploying the predictive model and the prescriptive model to be online and configured to intake real-time data from the second system; generating predictions through the predictive model from the real-time data; generating prescriptive actions through the prescriptive model from the predictions; and controlling the operations of the second system according to the prescriptive actions as illustrated in FIG. 1(a).

Processor(s) 710 can be configured to autonomously update the predictive model and the prescriptive model from the feedback from the second system through the online learning process while the predictive model and the prescriptive model are deployed on the second system by determining an error based on a difference between the feedback from the second system and a prediction from the prediction model associated with the controlling of the operations; wherein processor(s) 710 for the second system is configured to retrain the predictive model and the prescriptive model based on real time data, the error, and the feedback through a continuous learning process while the predictive model and the prescriptive model are deployed at the second system; and for the retrained predictive model and the retrained prescriptive model having better performance than the predictive model and the prescriptive model, deploying the retrained prescriptive model and the retrained predictive model to the second system as illustrated in FIG. 5(b).

Processor(s) 710 are configured to retrain, at the second system, the predictive model and the prescriptive model based on the real time data, the error, and the feedback through the continuous learning process while the predictive model and the prescriptive model are deployed at the second system by distributing machine learning processes for generating a retrained predictive model and a retrained prescriptive model into a plurality of local models associated with sub-systems of the second system; iteratively ensembling the plurality of local models to generate a plurality of retrained predictive models and a plurality of retrained prescriptive models and selecting ones of the generated plurality of retrained predictive models and generated plurality of retrained prescriptive models to be distributed back into the machine learning processes; and ensembling the plurality of local models to generate the retrained predictive model and the retrained prescriptive model as illustrated in FIG. 3.

Processor(s) 710 are configured to retrain, at the second system, the predictive model and the prescriptive model based on the real time data, the error and the feedback through the continuous learning process while the predictive model and the prescriptive model are deployed at the second system by retraining the predictive model and the prescriptive model based on the real time data, error and feedback through one or more of a reinforcement learning process or a transfer learning process as illustrated in FIG. 3.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and components in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for generation and deployment of automated and autonomous self-learning machine learning models, the method comprising:

generating a predictive model and a prescriptive model through an offline learning process at a first system;

controlling operations of a second system through deploying the predictive model and the prescriptive model to the second system, wherein the controlling operations of the second system through deploying the predictive model and the prescriptive model to the second system comprises:

deploying the predictive model and the prescriptive model to be online and configured to intake real-time data from the second system;

generating predictions through the predictive model from the real-time data;

generating prescriptive actions through the prescriptive model from the predictions; and controlling the operations of the second system according to the prescriptive actions; and autonomously updating the prescriptive model and the predictive model from feedback from the second system through an online learning process while the prescriptive model and the predictive model are deployed on the second system.

2. The method of claim 1, wherein the controlling operations of the second system through deploying the predictive model and the prescriptive model to the second system comprises executing an automated application of prescriptive actions generated from the prescriptive model to change operations of the second system.

3. The method of claim 1 wherein the generating the predictive model and the prescriptive model through the offline learning process at the first system comprises:

generating, from a solution configuration file, a descriptive component configured to conduct descriptive analysis;

generating, from the solution configuration file and the descriptive analysis, an exploratory component configured to conduct exploratory analysis;

generating, from the solution configuration file and the exploratory analysis, a predictive component configured to incorporate one or more machine learning libraries specified in the solution configuration file to generate the predictive model; and generating, from the solution configuration file and the predictive model, a prescriptive component configured to map prescriptive actions to results from the predictive model to generate a prescriptive model.

4. The method of claim 1, wherein the autonomously updating the predictive model and the prescriptive model from the feedback from the second system through the online learning process while the predictive model and the prescriptive model are deployed on the second system comprises:

determining an error based on a difference between the feedback from the second system and a prediction from the predictive model associated with the controlling of the operations;

retraining, at the second system, the predictive model and the prescriptive model based on real time data, the error, and the feedback through a continuous learning process while the predictive model and the prescriptive model are deployed at the second system; and for the retrained predictive model and the retrained prescriptive model having better performance than the predictive model and the prescriptive model, deploying the retrained prescriptive model and the retrained predictive model to the second system.

5. The method of claim 4, wherein the retraining, at the second system, the predictive model and the prescriptive model based on the real time data, the error, and the feedback through the continuous learning process while the predictive model and the prescriptive model are deployed at the second system comprises:

distributing machine learning processes for generating a retrained predictive model and a retrained prescriptive model into a plurality of local models associated with sub-systems of the second system;

iteratively ensembling the plurality of local models to generate a plurality of retrained predictive models and a plurality of retrained prescriptive models and selecting ones of the generated plurality of retrained predictive models and generated plurality of retrained prescriptive models to be distributed back into the machine learning processes; and ensembling the plurality of local models to generate the retrained predictive model and the retrained prescriptive model.

6. The method of claim 4, wherein the retraining, at the second system, the predictive model and the prescriptive model based on the real time data, the error and the feedback through the continuous learning process while the predictive model and the prescriptive model are deployed at the second system comprises:

retraining the predictive model and the prescriptive model based on the real time data, error and feedback through one or more of a reinforcement learning process or a transfer learning process.

7. A system for generation and deployment of automated and autonomous self-learning machine learning models, the system comprising:

a first system, comprising a processor configured to:

generate a predictive model and a prescriptive model through an offline learning process;

control operations of a second system through deploying the predictive model and the prescriptive model to the second system, wherein the processor is configured to control operations of the second system through deploying the predictive model and the prescriptive model to the second system by:

deploying the predictive model and the prescriptive model to be online and configured to intake real-time data from the second system;

generating predictions through the predictive model from the real-time data;

generating prescriptive actions through the prescriptive model from the predictions; and controlling the operations of the second system according to the prescriptive actions; and autonomously update the prescriptive model and the predictive model from feedback from the second system through an online learning process while the prescriptive model and the predictive model are deployed on the second system.

8. The system of claim 7, wherein the processor is configured to control operations of the second system through deploying the predictive model and the prescriptive model to the second system by executing an automated application of prescriptive actions generated from the prescriptive model to change operations of the second system.

9. The system of claim 7, wherein the processor is configured to generate the predictive model and the prescriptive model through the offline learning process at the first system by:

generating, from a solution configuration file, a descriptive component configured to conduct descriptive analysis;

generating, from the solution configuration file and the descriptive analysis, an exploratory component configured to conduct exploratory analysis;

generating, from the solution configuration file and the exploratory analysis, a predictive component configured to incorporate one or more machine learning libraries specified in the solution configuration file to generate the predictive model; and generating, from the solution configuration file and the predictive model, a prescriptive component configured to map prescriptive actions to results from the predictive model to generate a prescriptive model.

10. The system of claim 7, wherein the processor is configured to autonomously update the predictive model and the prescriptive model from the feedback from the second system through the online learning process while the predictive model and the prescriptive model are deployed on the second system by:

determining an error based on a difference between the feedback from the second system and a prediction from the prediction model associated with the controlling of the operations;

wherein the second system is configured to retrain the predictive model and the prescriptive model based on real time data, the error, and the feedback through a continuous learning process while the predictive model and the prescriptive model are deployed at the second system; and for the retrained predictive model and the retrained prescriptive model having better performance than the predictive model and the prescriptive model, deploying the retrained prescriptive model and the retrained predictive model to the second system.

11. The system of claim 10, wherein the second system is configured to retrain the predictive model and the prescriptive model based on the real time data, the error, and the feedback through the continuous learning process while the predictive model and the prescriptive model are deployed at the second system by:

distributing machine learning processes for generating a retrained predictive model and a retrained prescriptive model into a plurality of local models associated with sub-systems of the second system;

iteratively ensembling the plurality of local models to generate a plurality of retrained predictive models and a plurality of retrained prescriptive models and selecting ones of the generated plurality of retrained predictive models and generated plurality of retrained prescriptive models to be distributed back into the machine learning processes; and ensembling the plurality of local models to generate the retrained predictive model and the retrained prescriptive model.

12. The system of claim 11, wherein the second system is configured to retrain the predictive model and the prescriptive model based on the real time data, the error and the feedback through the continuous learning process while the predictive model and the prescriptive model are deployed at the second system by:

retraining the predictive model and the prescriptive model based on the real time data, error and feedback through one or more of a reinforcement learning process or a transfer learning process.

13. A non-transitory computer readable medium, storing instructions for generation and deployment of automated and autonomous self-learning machine learning models, the instructions comprising:

generating a predictive model and a prescriptive model through an offline learning process at a first system;

controlling operations of a second system through deploying the predictive model and the prescriptive model to the second system, wherein the controlling operations of the second system through deploying the predictive model and the prescriptive model to the second system comprises:

deploying the predictive model and the prescriptive model to be online and configured to intake real-time data from the second system;

generating predictions through the predictive model from the real-time data;

generating prescriptive actions through the prescriptive model from the predictions; and controlling the operations of the second system according to the prescriptive actions; and autonomously updating the prescriptive model and the predictive model from feedback from the second system through an online learning process while the prescriptive model and the predictive model are deployed on the second system.

* * * * *